(12) United States Patent
Carrara

(10) Patent No.: US 6,360,092 B1
(45) Date of Patent: Mar. 19, 2002

(54) REMOTE UNBLOCKING OF ACCESS TO A TELECOMMUNICATION SERVICE

(75) Inventor: Jean-Louis Carrara, Dallas, TX (US)

(73) Assignee: Gemplus (FR)

( * ) Notice: Subject to any disclaimer, the term of this patent is extended or adjusted under 35 U.S.C. 154(b) by 0 days.

(21) Appl. No.: 09/443,163

(22) Filed: Nov. 19, 1999

Related U.S. Application Data

(63) Continuation of application No. PCT/WO98/53628, filed on May 20, 1998.

(30) Foreign Application Priority Data

May 20, 1997 (FR) ............................................. 97 06428

(51) Int. Cl.[7] .......................... H04M 1/66; H04M 1/68; H04M 3/16; H04M 3/00; H04B 1/38
(52) U.S. Cl. ....................... 455/410; 455/411; 455/419; 455/558
(58) Field of Search ................................ 455/558, 410, 455/411, 466, 419, 420, 404

(56) References Cited

U.S. PATENT DOCUMENTS

| | | | | |
|---|---|---|---|---|
| 5,444,764 A | * | 8/1995 | Galecki | 455/411 |
| 5,517,554 A | | 5/1996 | Mitchell et al. | 455/411 |
| 5,600,708 A | * | 2/1997 | Meche et al. | 455/411 |
| 5,907,804 A | * | 5/1999 | Schroderus et al. | 455/411 |
| 5,913,175 A | * | 6/1999 | Pinault | 455/558 |
| 5,940,773 A | * | 8/1999 | Batvesten | 455/558 |
| 6,011,976 A | * | 1/2000 | Michaels et al. | 455/466 |

FOREIGN PATENT DOCUMENTS

| | | | |
|---|---|---|---|
| DE | 4317143 | 12/1994 | |
| EP | 669774 | 8/1995 | |
| WO | 96/27270 | 9/1996 | |
| WO | 98/53628 | 11/1998 | |
| WO | 99/17570 | * 4/1999 | 455/410 |

OTHER PUBLICATIONS

A.J. Farrugia et al., "Smart Card Technology Applied to the Future European Cellular Telephone on the Digital D–Network", Smart Card 2000, pp. 93–107, 1991 Elsevier Science Publishers, B.V.

Copy of the International Prelminary Examination Report.

* cited by examiner

Primary Examiner—Nay Maung
Assistant Examiner—Raymond B Persino
(74) Attorney, Agent, or Firm—Burns, Doane, Swecker & Mathis, L.L.P.

(57) ABSTRACT

The invention concerns clearing by telephone access to a telecommunication network service, the access using a set (SUB1) of identification data (PIN1, IMSI1, MSISDN) stored in an identification module (SIM), access to the service being blocked (B1) in response to an event (WPIN3) or an absence of an event (PIN). The invention proposes using a supplementary set 9SUB2) of identification data 9INSI2, MSISDN) stored in the identification module (SIM) and/or proposes a restricted communication mode (COM SC) for communicating with the maintenance center (SC) when access is blocked for remote clearing of access to the service.

29 Claims, 3 Drawing Sheets

REMOTE UNBLOCKING OF ACCESS TO A TELECOMMUNICATION SERVICE

This application is a continuation of PCT/WO98/53628 filed May 20, 1998.

This application is based on French Patent Application No. 97/06428, filed on May 20, 1997, which is incorporated by reference herein.

BACKGROUND

1. Field of the Invention

The present invention relates the field of systems for access to services available on telephone networks, notably systems for coded access to communication services by mobile telephones.

2. Related Background

Such systems for access to telephone services provide for a check on the service subscription number and a check on the secret code of a user of the subscription, which prevents the use of the telephone service by unauthorised third parties.

FIG. 1 illustrates, for example, a system of a known type in which the mobile telephone set 1 is in radiotelephonic connection with a telephone network PN. The mobile telephone 1 generally functions with a standard anti-fraud device, for example with a plug-in subscription identification module SIM (chip card).

A first role of the known anti-fraud devices consists in causing the subscription number for the mobile telephone used to be recognised so that the communications of the telephone set are authorised. For example, the subscription identification module SIM produces an encrypted identification message which enables the network PN, notably a retransmission station 2 in the network, to recognise the subscription number of the mobile telephone used.

The mobile telephone 1 regularly sends identification messages during its functioning, on stand-by or in active mode, in order to indicate its presence in a coverage area (referred to as a cell) of a station 2. The location and identification of the mobile telephone 1 enables the network to route the communications intended for the mobile telephone or issuing from the mobile telephone, via the most suitable retransmission station 2. Identification of the subscription makes it possible to prevent fraud, since another telephone cannot send the same type of encrypted identification message and use the subscription of the mobile telephone 1.

A second role of the known anti-fraud devices consists of identifying the user by his secret code in order to prevent the use of the telephone by unauthorised third parties. The mobile telephone 1 generally has a numeric keypad enabling the user to key in a personal identification code PIN and to access the services of his own telephone set 1.

The standard anti-fraud devices provide for a definitive blocking of access to a mobile telephone 1 after a limited number of attempts to key in the personal identification code PIN, these attempts generally being limited to three in number.

More generally, services available on telephone networks provide for coded access with blocking procedures in the event of code errors or at the end of subscription to the service.

One drawback of the systems for coded access to services available on a communication network by coded access telephone is that the unblocking of the access can take place only through the transmission of an unblocking code to the user by the service provider and a procedure depending on the telephone used. Notably with the increasing number of mobile telephone users, and the complications of the personal identification codes resulting from this, erroneous attempts with personal identification codes and blocking of telephone sets are becoming more and more frequent. Unblocking mobile telephones creates an overload for the service provider and frustration for the user.

One aim of the present invention is to produce a system for coded access to services available on a telephone communication network, eliminating the aforementioned drawbacks, whilst preserving a high level of security for the anti-fraud device.

SUMMARY

Succinctly, this aim is achieved by producing a system for unblocking access to a service available on a telephone network, the unblocking of the access being effected by telephone communication with a maintenance service, communications on the telephone of the user during the blocking being simply restricted to the maintenance service, or accessible by means of another subscription code.

One advantage of the access unblocking system according to the invention is that it allows remote unblocking of access since the telephone can still communicate with the maintenance centre when it is blocked.

According to the invention, a method of unblocking access to a service available on a telephone communication network is provided, the said access using identification steps utilising a set of identification data stored in an identification module, access being blocked in response to an event or in the absence of an event, access being unblocked by loading unblocking commands at the identification module, characterised in that it includes steps consisting in:

providing a supplementary set of identification data stored in the identification module, and establishing communication between the telephone and a maintenance centre using the supplementary set when access is blocked, in order to enable remote unblocking of access to the service of the network.

In addition, the invention provides for another method of unblocking access to a service available on a telephone communication network, the said access using identification steps utilising a set of identification data stored in an identification module, access being blocked in response to an event or in the absence of an event, access being unblocked by loading unblocking commands at the identification module, characterised in that it includes steps consisting in:

providing a restricted communication mode, any communications from the telephone being restricted to a maintenance centre according to the said mode, and using the restricted communication mode when access is blocked, in order to permit remote unblocking of access to the service of the network.

The invention applies particularly to unblocking of the code for access to a communication service by mobile telephone.

According to the invention, provision is made for a device for unblockable access to a service available on a telephone communication network, the device having subscription identification means making it possible to access the service of the network by telephone communication by transmitting a set of identification data, access being blocked in response to an event or in the absence of an event, characterised in that, when access is blocked, the identification means transmit a supplementary set of identification data and make it possible to access a maintenance centre by telephone communication, the telephone communications being restricted to the maintenance centre when the supplementary set of data is transmitted, in order to permit remote unblocking of access to the service of the network.

Provision is made for the maintenance centre to transmit unblocking commands at a distance and/or automatically, preferably according to a condensed command message service.

The invention also provides for a subscription identification chip card allowing unblockable access to a service available on a telephone communication network, the card having:

means of storing at least one set of identification data, characterised in that it has:

means able to establish restricted communications with a maintenance centre, and means for loading and effecting access unblocking commands.

Other characteristics, aims and advantages of the present invention will emerge from a reading of the following description and drawings, given solely by way of non-limitative examples; in the accompanying drawings:

FIG. 1, described previously, depicts a mobile telephone system with coded access of a known type;

DETAILED DESCRIPTION

Figure 1:
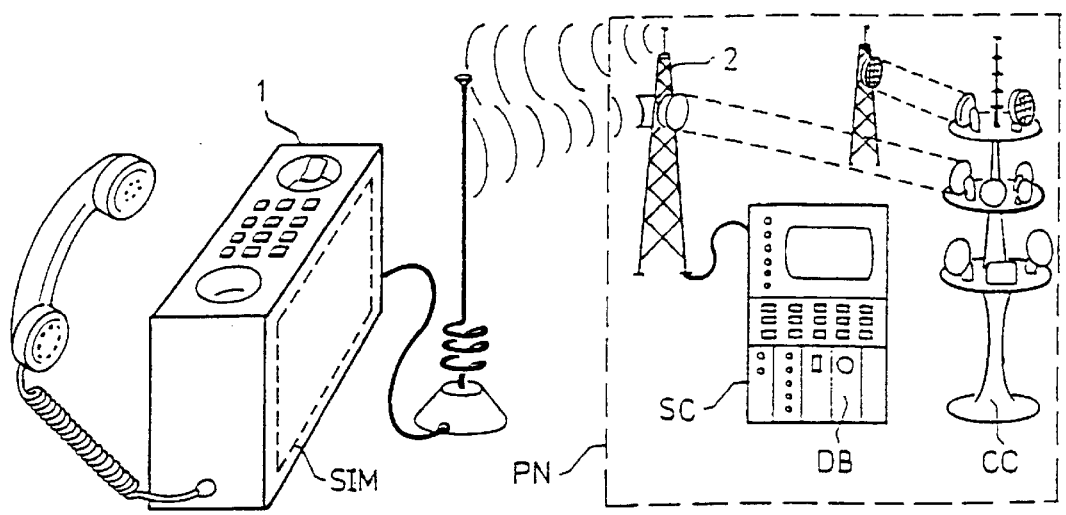

A mobile telephone system able to implement the invention includes subscription identification means SIM. These means SIM can be located on a plug-in printed circuit card in the mobile telephone unit 1, as can be seen in FIG. 1.

According to a preferred embodiment of the invention, provision is made for the subscription identification means SIM to be located on a chip card or any portable medium with microprocessor and memory, constituting a complementary electronic circuit of the mobile telephone, the mobile telephone 1 having for example a chip card reader. This preferred embodiment will be detailed below.

Various equivalent embodiments of the subscription identification means are within the capability of a person skilled in the art and will not be detailed in the present document. Only the functionalities of the electronic circuits provided in accordance with the invention will be detailed below.

Figure 2:
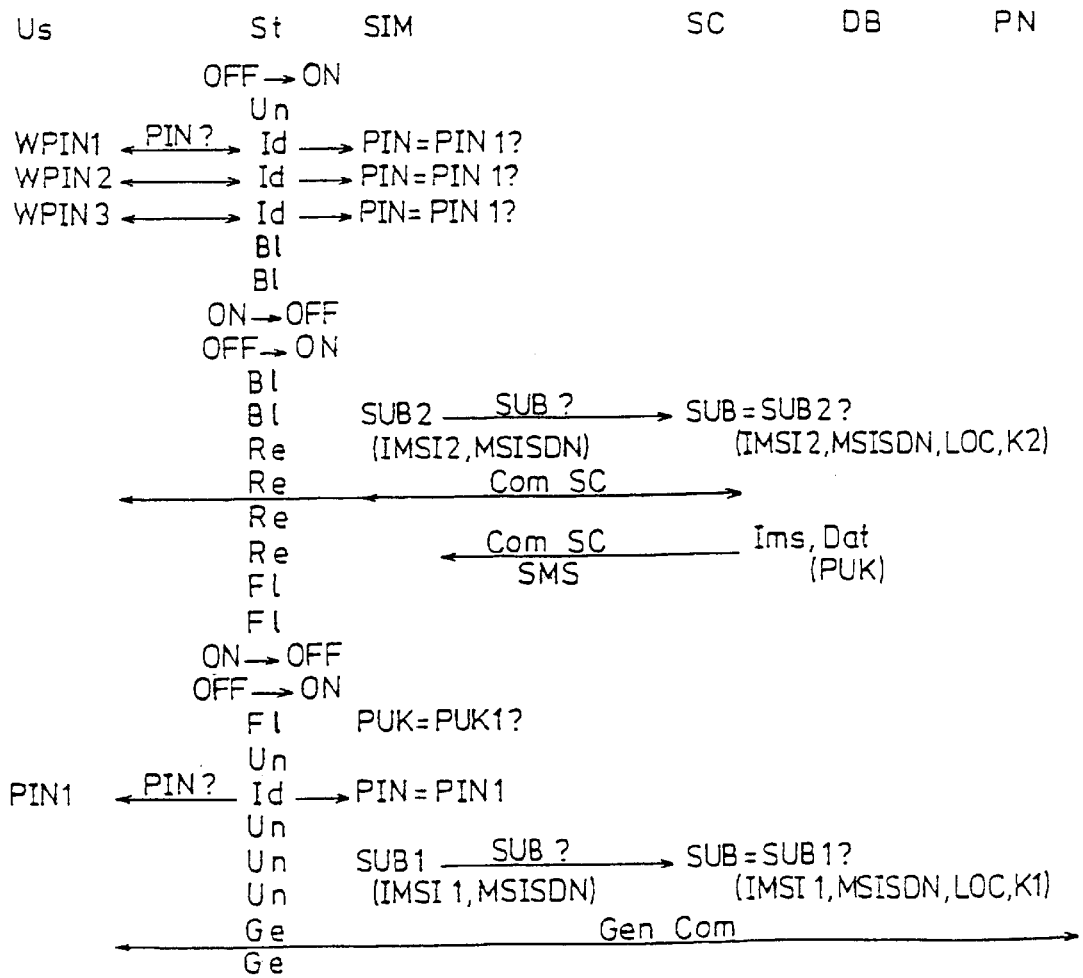
FIG. 2 shows diagrammatically an unblocking of access to a telephone service according to the invention.
Figure 3:
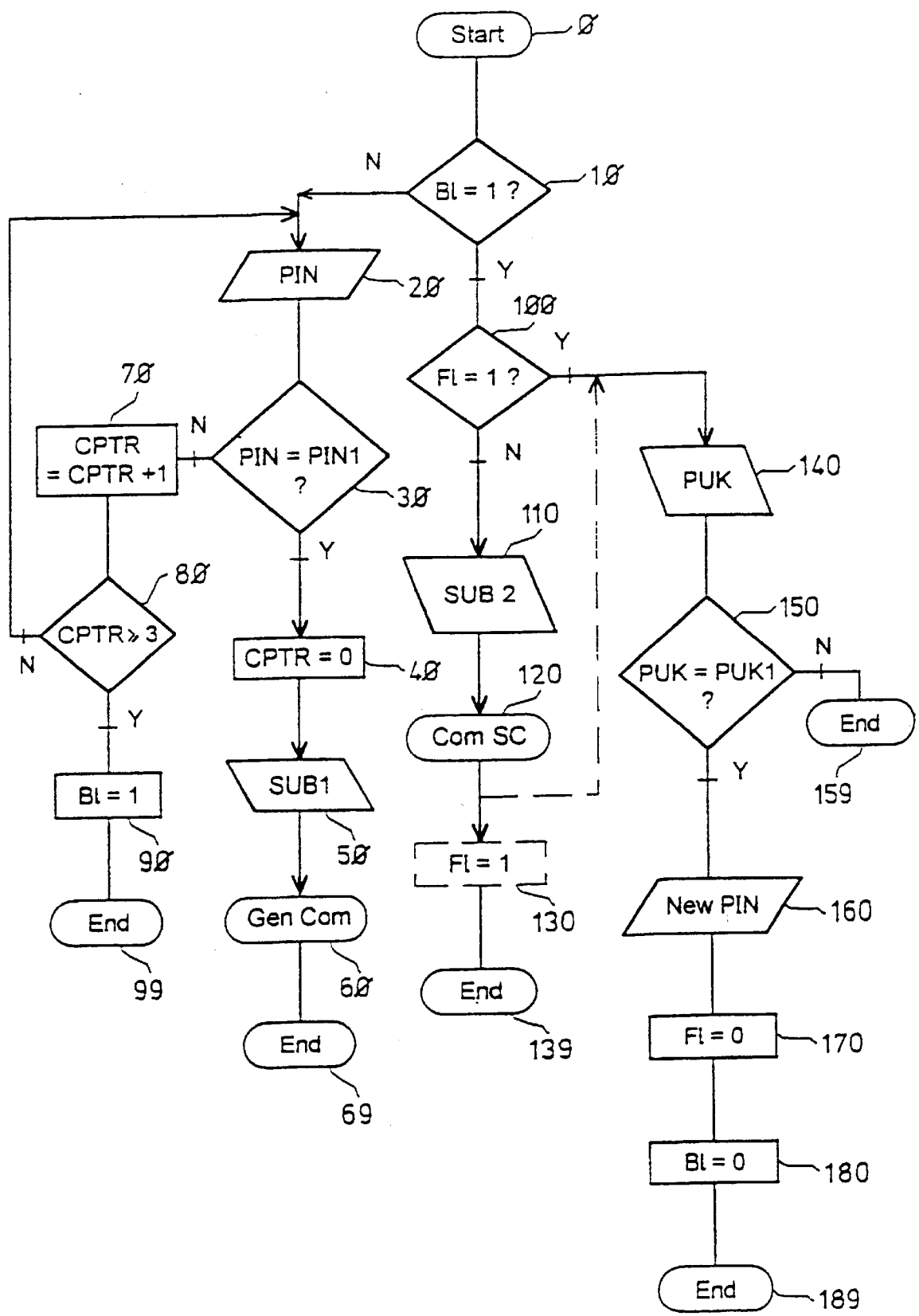
FIG. 3 shows diagrammatically the steps of a process of unblocking access to the telephone service according to the invention.

The normal functioning of a telephone system with remote unblockable access is illustrated in the left-hand part of FIG. 3 by steps 0 to 99. The data exchanges provided for during the normal functioning are also illustrated in the last six lines of FIG. 2.

In detail, the starting step 0 corresponds to the switching-on of the mobile telephone 1, that is to say powering up before any radiotelephonic communication. The mobile telephone system commences an identification process, preferably as soon as it is switched on, so that the retransmission station 2 of the cell where it is situated recognises its subscription number (MSISDN) and can send to it the telephone calls which are intended for it.

For this purpose, as illustrated in FIG. 2, the mobile telephone system 1 will send an encrypted message SUB1, from a set of data, intended for the local station 2 of the telephone network PN, the set of data being recognisable by decrypting at the station 2. The decrypting of the message SUB is preferably effected by a server centre CC connected to the station 2 receiving the encrypted message SUB1 of encrypted data.

The mobile telephone system has for this purpose subscription identification means SIM, storing and using identification data and encrypting algorithms, the stored data making it possible on the one hand for the mobile telephone to recognise a user US and on the other hand for the mobile telephone 1 to make itself recognised by the network PN.

As can be seen at the bottom of FIG. 2 in an identification step Id, as from the switching on OFF-ON, the identification means SIM requests the user US to enter a personal identification code PIN. In the step Id, the subscription identification means SIM compare the code PIN entered by the user and the code PIN1 stored in memory. When the code PIN entered is valid, the mobile telephone system 1 goes to a subscription identification step, the subscription identification means being in an unblocked state Un. At the start of this step Un, the mobile telephone sends an encrypted message SUB1 of data corresponding to the identification of the mobile telephone subscription. The encrypted messages SUB sent by the telephone change at each identification step in order not to be imitated. An encrypted message SUB1 is produced by the subscription identification means SIM of the telephone 1 from data in memory, such as a mobile telephone subscription identification number IMSI1 and a secret digital encrypting key K1.

A preferred embodiment of the operating algorithm of the subscription identification means and a means of blocking access to a telephone service according to the invention is shown diagrammatically in FIG. 3. The normal process of identifying the user and identifying the subscription is detailed in steps 10, 20, 30, 40 and 50.

At step 10, means SIM consult the blocking state indicator B1. If the system is in an unblocked state Un, for example if the indicator B1 has a zero value, the subscription identification means SIM pass to step 20 and request from the user his personal identification code PIN. If the valid code PIN1 is keyed in, the system, passing to steps 40 and 50, sends the encrypted subscription identification message SUB1. When the local transmission station 2 and the service centre CC decrypt the message SUB1 with the secret key K1 and recognise the subscription identifier number IMSI1, the mobile telephone system is ready to communicate. More precisely, a database DB of the maintenance centre SC stores the mobile telephone subscription number MSISDN under the identifier number IMSI1, with the location area LOC, so as to be able to route a call intended for the mobile telephone 1 via the most suitable retransmission station 2. It should be noted that the telephone 1 is identified and located continuously even when it is in stand-by state, so that a call can be routed to it.

If the code PIN keyed in is erroneous, the system counts this error at step 70 by incrementing a counter CPTR. As long as the counter CPTR has a value less than three according to the example of step 80, the system re-requests its code PIN from the user by returning to step 20.

When too many unsuccessful attempts have been made in succession, for example when the counter CPTR has a value greater than or equal to three, the system goes into a blocked state B1, the value of the indicator B1 being set to 1, at step 90.

Otherwise, after the success of the steps 10, 20, 30, 40 and the step 50 of subscription identification by sending the encrypted message SUB1, the user can effect whatever extended communications Gen Com he wishes (step 60). Provision is notably made for the step 20 of keying in the code PIN1 not to be repeated during subsequent communications by the user, the steps 20 and 30 of identification Id being effected only when the system is switched on.

Blocking of the system occurs in the example of functioning of the algorithm of FIG. 3, after three unsuccessful code attempts have been made and the state indicator B1 is set to a value 1 of step 90. Access to the communications is then impossible, the mobile telephone system 1 storing, in a non-erasable memory, the value 1 of the state indicator B1. Each time the system is switched on again, access at step 60 of normal communication is prevented, the blocking state B1=1 being recognised from the first step 10.

The invention does however make provision for possibilities of communication when the system is in a blocked state B1, after having exceeded the limited number of attempts, for example.

A first possibility, according to the invention, provides for the system to use an additional set of subscription identification data in order to enter into communication with a maintenance centre with this emergency subscription.

A second possibility, according to the invention, provides for the system to enter into restricted communication mode with the maintenance centre.

These two possibilities are combined in the example of FIG. 2.

FIG. 2 depicts, by columns and rows following each other chronologically, the operations of the user US, the state St and the operations of the identification means SIM, the operations of the maintenance centre SC and the content of the database DB as well as the telephonic exchanges between the user US, the identification means SIM of the mobile telephone, the maintenance centre SC and a partner on the network PN.

The first rows in FIG. 2 show an example of switching-on OFF-ON of the mobile telephone followed by three identification rows Id. In the case of FIG. 2, the means SIM three times request the code PIN and the user successively keys in three erroneous codes WPIN1, WPIN2 and WPIN3. The system therefore goes into a blocked B1 state St. Next, once the user has interrupted ON-OFF and restarted OFF-ON the mobile telephone set 1, the system goes into restricted communication mode Rl. The subscription identification means SIM then send the supplementary set SUB2 of data IMSI2, K2 in the form of an encrypted message SUB to the server centre SC of the network PN.

The right-hand part of the algorithm of FIG. 3 illustrates an example of functioning of the subscription identification means during a blocking phase.

It can be seen that, after the step 90 where the indicator B1 takes the value 1, the user can only switch the mobile telephone set 1 on again. The algorithm then automatically concatenates the starting step 0, then the steps 10 and 100, of testing B1 and F1. As the state indicator B1 has the value 1 and accepting that another state indicator F1, whose role will be explained subsequently, has a zero value, the algorithm passes to the step 110, which provides, according to the invention, for the identification means SIM of the mobile telephone 1 to transmit to the telephone network PN an encrypted message SUB using the supplementary set SUB2 of data.

The use of the particular supplementary set SUB2 of data SUB2 will enable the network PN and maintenance centre SC to recognise the blocked state of the system whilst identifying the mobile telephone subscription.

For this purpose provision is made for the second encrypted message SUB to be calculated by the encrypting algorithm from a supplementary set SUB2 of data, including for example the same mobile telephone subscription number MSISDN, another identifier number IMSI2 and another secret encrypting key K2 with respect to the set SUB1 of data MSISDN, IMSI1, K1 normally used, in the unblocked state.

The supplementary set SUB2 of data of the message SUB can be sent automatically to the maintenance centre SC without the user taking any action. The telephone number N°SC of the maintenance centre SC is in this case stored in the subscription identification means SIM. Provision can also be made for the maintenance centre SC not to effect switching of the telephone numbers dialled by the user when the supplementary set SUB2 of data is sent, but automatically to enter into communication with the user.

The maintenance centre SC therefore decrypts the messages which it receives with the second key K2, the two secret keys K1 and K2 being stored in the database DB under the mobile telephone subscription number MSISDN in order to facilitate the decrypting of the messages received. The supplementary set SUB of identification data serves as a kind of emergency set when the normal communications are blocked.

Provision is made for the supplementary set SUB of data of the message SUB to make it possible to access solely the maintenance centre SC, the communications being restricted to this centre when the system is in the blocked state B1=1.

The user can then enter into communication solely with the maintenance centre SC, according to the restricted communication mode Re, whatever the telephone number dialled.

An operator at the centre SC or an automatic interrogation process then interrogates the user during such a communication Com SC, in restricted mode Re.

The maintenance centre SC can then send the commands Ins, Dat re-establishing normal functioning of the mobile telephone system 1.

During such restricted telephone communications, the preferred embodiment of the invention provides for the maintenance centre SC to send instructions Ins and data Dat for unblocking the coded access. Preferably the instructions Ins make it possible to use an unblocking code PUK1 contained in memory (not accessible externally) of the subscription identification means SIM. However, the unblocking code PUK1 can also be communicated directly by the maintenance centre SC amongst the unblocking data Dat. All these instructions Ins, data Dat and unblocking code PUK1 are generally designated as unblocking commands.

A first variant embodiment provides for access to the telephone service to be unblocked simply by supply of the unblocking code PUK1.

A second variant embodiment of the invention provides for the sending of the unblocking commands by the maintenance centre SC to give rise to the lifting of a flag, the state indicator F1 being set to a value 1 at a step 130. This flag indicates that unblocking of the system is currently taking place. Unblocking of the system then commences when the system is switching on again OFF/ON in accordance with steps 0, 10, 100 and 140 of the process in FIG. 3.

Preferably, the state indicator F1 of the mobile telephone system 1 is set to the value 1 by the maintenance centre SC, which sends an instruction Ins corresponding to the lifting of the flag.

The operating algorithm of the mobile telephone system can also include a step 130 of setting the indicator F1 to the value 1 after the end of a communication with the maintenance centre SC at step 120.

A step 100 of testing the indicator F1 is then provided for, as can be seen in the algorithm in FIG. 3.

Thus the system 1 enters into restricted communication with the maintenance centre SC, in accordance with steps 110, 120, 130 and 139, only if the indicator F1 has a zero value, that is to say if the user has not yet communicated with the maintenance centre SC.

After checking the identity of the user at step 120 and sending the commands Ins, Dat and possibly the unblocking command PUK1, provision can be made for the unblocking of the system to commence directly at a step 140. The algorithm of FIG. 3, however, provides for a variant in which the user must interrupt the functioning of the mobile telephone at a step 139 before unblocking of the system commences at step 140.

Thus, after the communication ComSC with the maintenance centre SC and preferably after switching on the mobile telephone again, the system, noting that the indicators B1 and F1 have values 1, requests the access unblocking code PUK at step 140. At step 150, the system checks the code PUK loaded (or keyed in by the user) compared with a code value PUK1 stored in memory.

If the unblocking code PUK is erroneous, the system remains in a blocked state St (B1=1) at step 159.

After validation of the code PUK, the algorithm can include a step 160 in which the user introduces a personal identification code value newPIN of his choice by way of personal identification code PIN. This identification code value newPIN will be stored by the subscription identification means SIM for all the subsequent steps 20, 30 of verifying the personal identification code. The state indicators F1 and B1 are obviously reset to zero values at steps 170 and 180 before the end 189 of the unblocking procedure. After the mobile telephone is switched off, normal operation resumes by passing through steps 0, 10, 20, 30 etc.

The invention preferably provides for communications in restricted mode to be effected on particular transmission channels such as condensed message service channels of the SMS channel type.

Such service channels are used by the service providers in order to gain access to the mobile telephone set and interrogate it, to effect digital operations or to send instructions.

A condensed message service described in the patent FR 2 704 704 makes it possible notably to have a reduced set of instructions, instructions therefore having a simple short coding. The reduced set of instructions includes the most usual operating instructions, the particular operations being excluded after a special instruction and the loading of the data and execution codes corresponding to each particular operation.

The use of such a condensed message service during communications between the maintenance centre and the mobile telephone system is particularly advantageous for rapid unblocking of the system. The condensed message service channel allows sending of the instructions Ins, data Dat and, if applicable, access unblocking codes PUK. The exchanges of information between the user and the maintenance centre can use the voice channel or be established automatically between the mobile telephone system 1 and the service centre SC by means of the condensed messages channel.

The advantage of the use of such service channels is the possibility of automating the access code remote unblocking procedure, the maintenance centre processing the user requests by computer and sending the unblocking commands in the form of condensed commands for greater speed.

The invention also affords an appreciable improvement in the ease of use of the mobile telephone by providing for a mobile telephone set 1 to be supplied in the blocked state initially, that is to say it automatically enters restricted communication mode Re with the maintenance centre at the first use.

The user is then in communication with an operator who can if necessary orally communicate to him his access unblocking code PUK, and detail to him the procedure for entering the code to be followed for reinitialising the personal identification code PIN. This advantageous variant can also enable the system to record a personal identification code newPIN as a choice of the user as from the first bringing into service.

The location of the subscription identification means according to the invention on a mobile telephone system can be effected in the form of a printed electronic circuit card which can be plugged into the mobile telephone unit.

A second embodiment consists in providing for the subscription identification means to be located on a chip card, the mobile telephone unit having a data transcriber on a chip card, also referred to as a reader.

An advantage of this second embodiment is to enable several users to effect communications from any mobile telephone set, each user being identified by the chip card and the access code which he keys in and his telephone subscription being authenticated by the data stored in the memory of the chip card.

Figure 4:
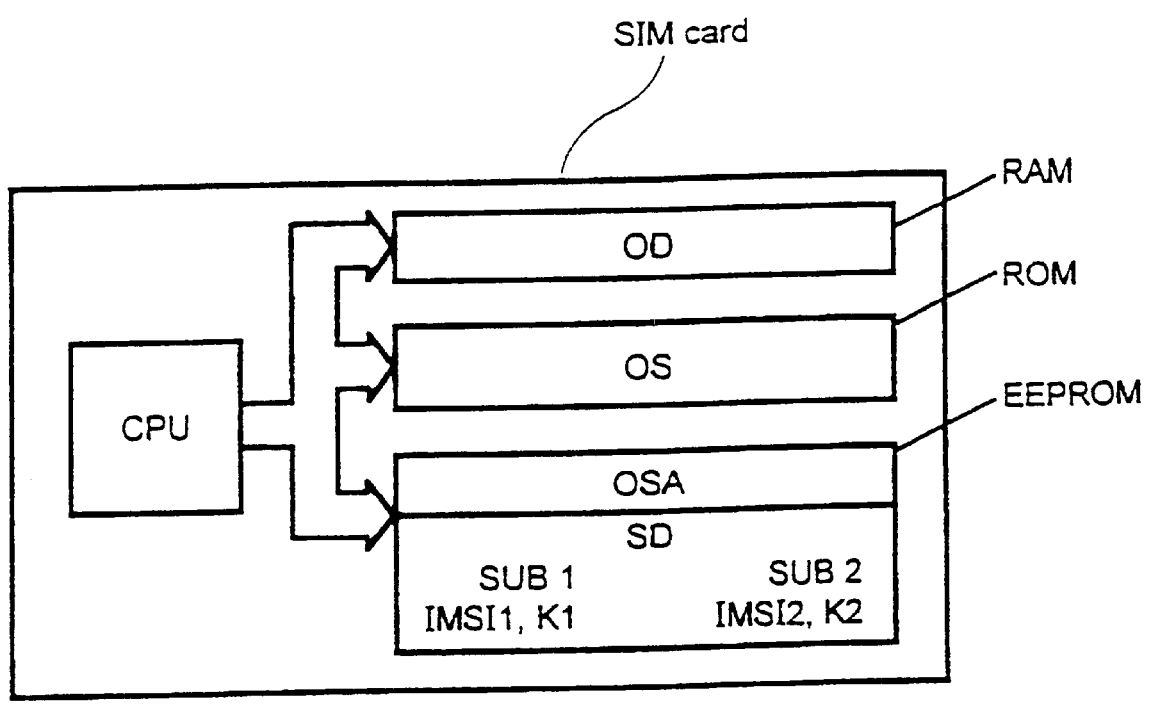
FIG. 4 depicts a chip card affording unblockable access to a telephone service according to the invention.

FIG. 4 illustrates a possible configuration of the electronic circuit referred to as a chip of such a SIM card. The circuit preferably includes a microprocessor CPU for implementing an operating program OS whose instructions are stored in the read only memory ROM, the temporary data and instructions being stored in the random access memory RAM. The design of such a conventional electronic circuit will not be detailed here.

One particularity of a subscription identification chip card allowing unblockable access to a telephone service according to the invention is that it includes means able to establish restricted communications with the maintenance centre. For example, a reprogrammable read only memory EEPROM contains an OSA program, the telephone number N°SC of the maintenance centre SC and possibly the access unblocking code PUK1.

Preferably, a chip card SIMCard allowing unblockable access according to the invention stores, notably in a reprogrammable read only memory EEPROM, a normal set SUB1 and a supplementary set SUB2 of identification data IMSI1, K1, IMSI2, K2, MSISDN intended for sending encrypted identification messages SUB according to the unblocked or blocked mode of the system.

The EEPROM memory can also contain a memory area for storing the value of the aforementioned state indicators B1, F1 or equivalent indicators Id, Bl, Re, Un, Fl whose value is modified during identification, blocked, restricted communication, unblocked and unblocking-underway modes, respectively.

The invention was disclosed above following the example of an unblocking of access to a mobile telephone communication service following the introduction of erroneous personal identification codes. However, the invention can be extended to the unblocking of access to any service available on a communication network by telephone, the unblocking of access taking place following an event or the absence of an event. The event means any event known to a person skilled in the art leading to a blocking of access to a service offered by a telecommunication network, for example an end to the rights of access to a temporary subscription, or the balance of a prepaid service, or a breakdown in access to a service offered by a communication network, a breakdown due either to the chip card, or to the network or other, provided that the supplementary set of subscription data permits access to the service. This type of access breakdown occurs in the case of overcapacity on a communication network, or in the event of a problem in initialising a mobile telephone during the routing (roaming) of international communications.

Other embodiments, characteristics and advantages of the invention will be clear to a person skilled in the art without departing from the scope of the following claims.

What is claimed is:

1. A method for controlling access by a device to a communication service provided by a telecommunication network, said device having a subscriber identification module storing identification data that is used to access said service, comprising the steps of:

storing first and second sets of identification data in said subscriber identification module;

initially accessing said service and conducting communications via said service using said first set of identification data stored in said module;

subsequently blocking access to said service via said first set of identification data in response to a specified condition;

detecting whether access to said service via said first set of identification data is blocked and, if so, establishing communication with said network using said second set of identification data stored in said module and retrieving a code for unblocking access to said service; and resuming access to said service and conducting communication using said first set of identification data.

2. The method of claim 1, wherein said communication that is established with said network using said second set of identification data is restricted to a predetermined resource in said network.

3. The method of claim 2, wherein said resource transmits said code to said device during said communication.

4. The method of claim 2, wherein said code is stored in said module, and said resource transmits information to said device for retrieving said code from said module.

5. The method of claim 1, wherein at least said first set of data includes a personal identification code.

6. The method of claim 5, further including the step of modifying the personal identification code in conjunction with unblocking access to said service via said first set of data.

7. The method of claim 5, wherein said specified condition includes erroneous entry of said personal identification code.

8. A method for controlling access by a device to a communication service provided by a telecommunication network, said device having a subscriber identification module storing identification data that is used to access said service, comprising the steps of:

initially accessing said service and conducting communications via said service using said identification data stored in said module;

subsequently blocking access to said service via said identification data in response to a specified condition;

detecting whether access to said service via said identification data is blocked and, if so, establishing communication that is restricted to a predetermined resource in said network and retrieving a code for unblocking access to said service; and resuming access to said service and conducting communication using said identification data.

9. The method of claim 8, wherein said resource transmits said code to said device during said communication.

10. The method of claim 8, wherein said code is stored in said module, and said resource transmits information to said device for retrieving said code from said module.

11. The method of claim 8, wherein said identification data includes a personal identification code.

12. The method of claim 11, further including the step of modifying the personal identification code in conjunction with unblocking access to said service via said identification data.

13. The method of claim 11, wherein said specified condition includes erroneous entry of said personal identification code.

14. A device for controlling access to a communication service provided by a telecommunication network, comprising:

a subscriber identification module having stored therein a first set and a second set of identification data;

means for initially accessing said service and conducting communications via said service using said first set of identification data stored in said module;

means responsive to a specified condition for blocking access to said service via said first set of identification data;

a controller that detects whether access to said service is blocked and, if so, establishes communication with said network using said second set of identification data to retrieve a code that unblocks access and restores the ability to communicate using said first set of identification data.

15. The device of claim 14, wherein said communication that is established with said network using said second set of identification data is restricted to a predetermined resource in said network.

16. The device method of claim 15, wherein said resource transmits said code to said device during said communication.

17. The device of claim 15, wherein said code is stored in said module, and said resource transmits information to said device for retrieving said code from said module.

18. The device of claim 14, wherein at least said first set of data includes a personal identification code.

19. The device of claim 18, wherein said controller requires a user to modify the personal identification code in conjunction with unblocking access to said service via said first set of data.

20. The method of claim 18, wherein said specified condition includes erroneous entry of said personal identification code.

21. A device for controlling access to a communication service provided by a telecommunication network, comprising:

a subscriber identification module having stored therein a set of identification data;

means for initially accessing said service and conducting communications via said service using said identification data stored in said module;

means responsive to a specified condition for blocking access to said service via said identification data;

a controller that detects whether access to said service is blocked and, if so, establishes communication that is restricted to a predetermined resource in said network to retrieve a code that unblocks access and restores the ability to communicate using said identification data.

22. The device method of claim 21, wherein said resource transmits said code to said device during said communication.

23. The device of claim 21, wherein said code is stored in said module, and said resource transmits information to said device for retrieving said code from said module.

24. The device of claim 21, wherein said identification data includes a personal identification code.

25. The device of claim 24, wherein said controller requires a user to modify the personal identification code in conjunction with unblocking access to said service via said identification data.

26. The method of claim 24, wherein said specified condition includes erroneous entry of said personal identification code.

27. A subscriber identification module for use with a device that accesses a communication service provided by a telecommunication network, comprising a memory having stored therein:

a first set of identification data that is normally used to access said service; and a second set of identification data that is used to establish communication that is restricted to a predetermined resource in said network when access to said service via said first set of identification data is blocked.

28. The subscriber identification module of claim 27, wherein said memory further has stored therein a code that can be retrieved in response to said restricted communication to unblock said access to said service.

29. The subscriber identification module of claim 27, wherein said module is embodied in a chip card.

\* \* \* \* \*